358-86. XR 3,280,249 SR

CROSS REFERENCE SEARCH ROOM

Oct. 18, 1966 E. J. GARGINI 3,280,249

WIRED BROADCASTING SYSTEMS AND APPARATUS THEREFOR

Filed May 17, 1963

TX 5002

INVENTOR
Eric John Gargini
BY
Richard [illegible]
Agt 3,280,249
Patented Oct. 18, 1966

3,280,249
WIRED BROADCASTING SYSTEMS AND APPARATUS THEREFOR

Eric John Gargini, West Drayton, Middlesex, England, assignor to Communications Patents Limited Filed May 17, 1963, Ser. No. 281,177
Claims priority, application Great Britain, May 25, 1962, 20,278/62
14 Claims. (Cl. 178—5.2)

Figures 1, 2, 3:
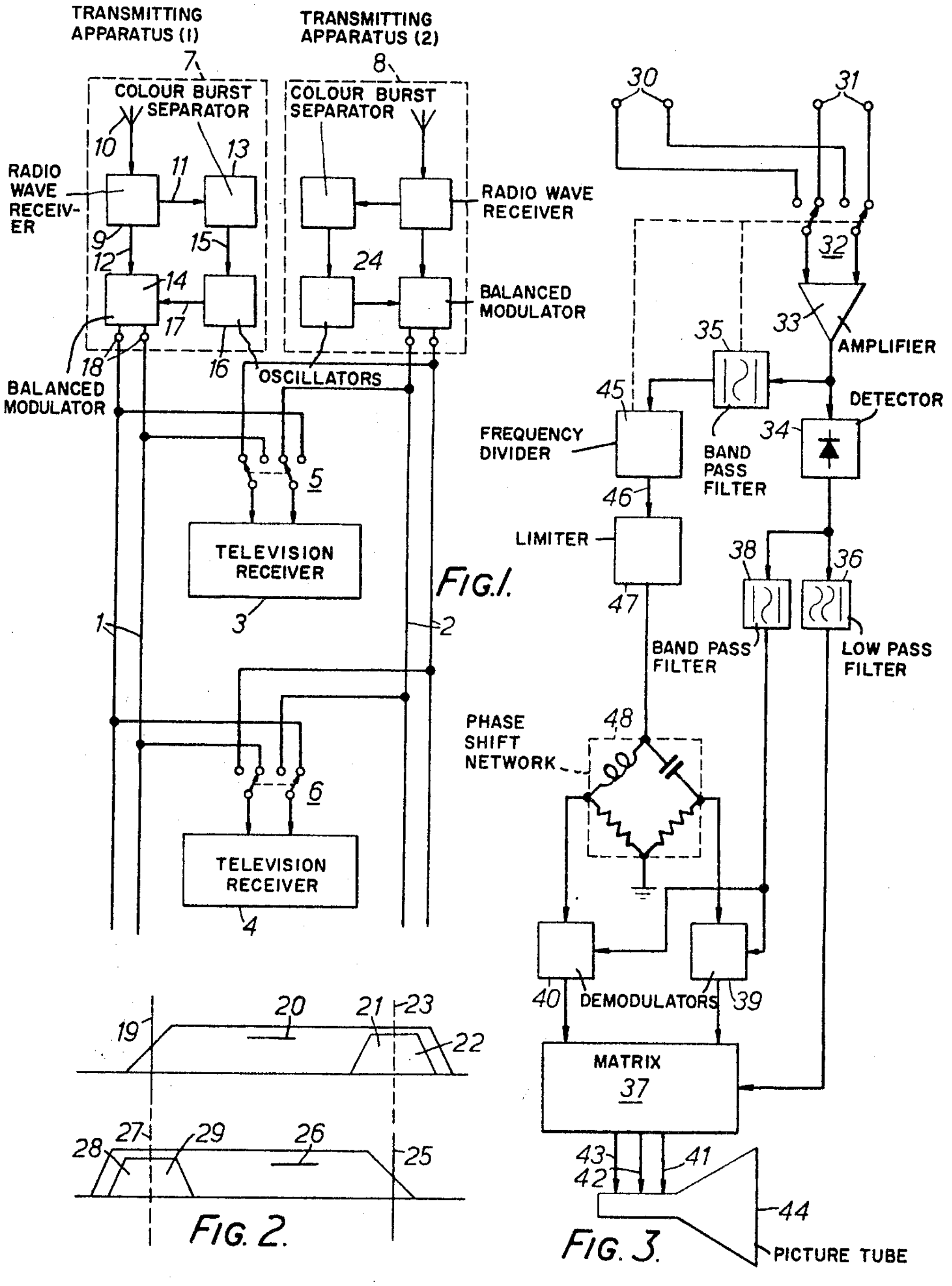

This invention relates to wired broadcasting systems and apparatus for use therein and is particularly concerned with such systems and apparatus which pertain to colour television.

An object of this invention is to enable colour television signals which are being radiated by a radio transmitter of a regular television service to be used for energising the conductive network of a wired broadcasting system in a manner which avoids patterning in the pictures which are produced with the aid of the signals being distributed by this network, in particular to avoid patterning due to the beating of carrier waves adopted for the purpose of effecting this distribution.

According to a first aspect of the invention there is provided a wired broadcasting system pertaining to colour television, wherein a transmitting apparatus which serves to energise a conductive network of the system produces and applies to said network a modulated carrier wave brightness information component and a suppressed carrier wave colour information component, and includes means which determine that the frequency of one of said carrier waves is a whole multiple of the frequency of the other in order to ensure that the picture produced with the aid of said components is not unduly if at all affected by the beating of these carrier waves or their harmonics.

According to a second aspect of the invention a colour television transmitting apparatus, for energising a conductive network of a wired broadcasting system, comprises a source of brightness information signals and a source of colour information signals in respect of a colour television transmission, means for obtaining two carrier waves the frequency of one of which is a whole multiple of the frequency of the other, means utilising said brightness information signals and one of said carrier waves to produce a modulated carrier wave brightness information component, means utilising said colour information signals and the other carrier wave to produce a suppressed carrier wave colour information component, and means for applying said components to the conductive network, the said frequency relationship of said carriers ensuring that the picture produced with the aid of said components is not unduly if at all affected by the beating of these carrier waves or their harmonics.

According to a third aspect of the invention a colour television transmitting apparatus, for energising a conductive network of a wired broadcasting system, comprises means which make available in respect of a colour television transmission modulated carrier wave brightness information signals, suppressed carrier wave colour information signals and a frequency information signal which is indicative of the frequency of the said suppressed carrier wave, means utilising said frequency information signal to provide two carrier waves the frequency of one of which is a whole multiple of the frequency of the other, means utilising said brightness information signals and one of said carrier waves to produce a modulated carrier wave brightness information component, means utilising said colour information signal and the other carrier wave to produce a suppressed carrier wave colour information component, and means for applying said components to the conductive network, the said frequency relationship of said carriers ensuring that the picture produced with the aid of said components is not unduly if at all affected by the beating of these carrier waves or their harmonics.

According to a fourth aspect of the invention a colour television transmitting apparatus, for energising a conductive network of a wired broadcasting system, comprises a receiving means which serves to extract, from a standard colour television transmission, brightness information signals, suppressed carrier wave colour information signals and a frequency information signal which is indicative of the frequency of said suppressed carrier, means utilising said frequency information signal to provide a continuous electric wave having the same frequency, and a modulator means utilising said continuous electric wave together with said brightness information signals and said suppressed carrier colour information signals to provide a modulated carrier wave brightness information component, the frequency of the carrier wave of which corresponds to that of the frequency information signal, and a suppressed carrier wave colour information component, the frequency of the suppressed carrier of which is twice that of the carrier wave of said brightness information component, this frequency relationship of the carrier waves which pertain to these two components ensuring that the picture produced with the aid of these components is not unduly if at all affected by the beating of these carrier waves or their harmonics.

According to a fifth aspect of the invention there is provided a colour television receiving apparatus, for use in a wired broadcasting system having a signal path which is energised by colour television signals comprising a modulated carrier wave brightness information component and a suppressed carrier wave colour information component, the frequency of one of said carrier waves being a whole multiple of the frequency of the other, wherein means are provided for obtaining a continuous electric wave which has a frequency corresponding to that of the carrier pertaining to said brightness information component, and means utilising this continuous electric wave to demodulate the said colour information component.

To facilitate a proper understanding of the invention it will now be described, merely by way of example with reference to the accompanying drawings, wherein:

FIG. 1 is a block diagram of a wired broadcasting system, including its transmitting and receiving apparatus, in accordance with the present invention, FIG. 2 is a diagram showing the frequency relationships of signals involved in the operation of the system shown in FIG. 1 and FIG. 3 is a detail block schematic diagram of a receiving apparatus suitable for use in the system shown in FIG. 1.

The conductive network of the wired broadcasting system shown in FIG. 1 comprises two signal paths, 1 and 2, for example two pairs of conductors of a suitable multipair cable. Each of these paths pertains to the distribution of colour television signals in respect of different transmissions each of which is in respect of different programme material. These paths serve to distribute the television signals from a central station to a plurality of subscribers receivers, two such subscribers receivers being indicated in the drawing at 3 and 4 respectively. Each of these receivers is associated with a programme selecting switch, 5 and 6 respectively, whereby its input circuit can be connected electrically with either of the two signal paths at will to accept the signals of the wanted programme.

The central station equipment comprises two sets of transmitting apparatus, 7 and 8, for the purpose of energising the signal paths 1 and 2 respectively. The transmitting apparatus 7, in respect of the first of the two transmissions, comprises a radio wave receiving apparatus 9 which, through the intermediary of an aerial 10, is adapted to receive radio wave colour television signals of a regular television service, it being assumed for the purpose of the following description that this service is being operated according to the 625 line N.T.S.C. system standard.

This receiver is arranged and adapted to extract, from the received radio signals, brightness information signals, suppressed carrier wave colour information signals and a colour burst or frequency information signal which is indicative of the frequency of the said suppressed carrier wave. These extracted signals are applied to lines 11 and 12 which feed them into a colour burst separator 13 and a balanced modulator 14 respectively. The colour burst separator 13 operates to separate from the signals applied thereto the frequency information signal having the frequency of the carrier pertaining to the colour information component and applies this signal, via a line 15, to a frequency and phase controlled oscillator 16 where it is used to make this oscillator provide a continuous electric wave which has the same frequency and phase as that of the suppressed carrier wave of the colour information component. This continuous electric wave is destined to be used as the re-insertion carrier for demodulating the suppressed carrier wave colour information signals and for this purpose is applied by way of a line 17 as another input to the balanced modulator 14. The latter operates to produce an output which comprises a modulated carrier wave brightness information component, the frequency of the carrier wave of which corresponds to that of the colour burst or frequency information signal and hence to that of the suppressed carrier of the colour information signal, and in addition a suppressed carrier wave colour information component the frequency of the suppressed carrier of which is twice that of the carrier wave of said brightness information component. These two components are fed to terminals 18 by way of which they are applied to the signal path 1 of the network for distribution to subscribers receivers.

The frequency relationship of the two components applied to this signal path 1 are indicated in FIG. 2 where it will be seen that the carrier, 19, of the amplitude modulated carrier wave brightness information component has a frequency $f_1$ (4.43 mc./s.), the modulation thereof occupying the frequency band 20. The suppressed carrier colour information component comprises sidebands 21 and 22, the frequency of the suppressed carrier wave 23 of this component being a whole multiple of the frequency of the carrier wave 19 (e.g. 8.86 mc./s.) and is indicated as $f_2$.

It will be observed that due to the difference between the frequencies $f_1$ and $f_2$ the sidebands 21 and 22 lie within the frequency band 20. However, if the frequency of the suppressed carrier 23 is made a higher whole multiple of the frequency of the carrier 19 the sidebands would lie outside the frequency band 20. The said frequency relationship of the carrier waves 19 and 23 ensure that the picture produced with the aid of these components is not unduly if at all affected by the beating of these carrier waves or their harmonics, this advantage being obtained by reason of the fact that such beating results in the production of signals which have zero frequency or a very low frequency.

The transmitting apparatus 8, pertaining to the second transmission, is similar to the transmitting apparatus 7 but in this case the frequencies of the carrier waves of the two components applied to the signal path 2 are inverted, that is to say the carrier wave pertaining to the brightness information component has the frequency $f_2$ and the carrier wave pertaining to the suppressed carrier colour information component has the frequency $f_1$. Because of this inverted arrangement of the carriers the oscillator, 24, of this apparatus, which is the equivalent of the oscillator 16 of the apparatus 7, is arranged to produce oscillations having a frequency which is twice the frequency of the colour burst or frequency information signal of the transmission with which this apparatus 8 is dealing. This inverted arrangement is shown in FIG. 2 where the carrier, 25, of the brightness information component is located at $f_2$, the brightness information sideband is 26, and the suppressed carrier, 27, of the colour information component is located at $f_1$ with its sidebands at 28 and 29. Such an inverted arrangement is desirable in order to minimise "crossview" but in cases where there is substantial electrical separation of the signal paths 1 and 2 it is possible to adopt the same or closely similar frequencies for the carriers pertaining to the brightness and colour components in respect of this transmitter 8 as those adopted for the corresponding components in respect of the transmitter 7.

In such a wired television broadcasting system, reception of either one or other of the two transmissions can be obtained by appropriate setting of the programme selection switch associated with each subscribers receiving apparatus, namely the switches 5 and 6 associated with the receivers 3 and 4 respectively.

In cases where two or more colour television programmes are concerned and in contrast to the example hereinbefore more particularly described with reference to FIGS. 1 and 2, the carriers pertaining to these programmes may be different, this is particularly true in cases where the transmissions originate from different radio television stations.

The television receiver shown in FIG. 3 comprises two pairs of input terminals 30 and 31, which are adapted to be connected to the conductors of the signal paths 1 and 2 respectively. A programme selection switch 32 (5 or 6 in FIG. 1) enables the input circuit of an amplifier 33 to be connected at will to either of the paths 1 and 2. The output of this amplifier is fed to a detector 34 and to a band pass filter 35. The signals present at the output of the detector 34 consist of a brightness information component, extending over a frequency band from zero to several megacycles per second, and a colour information component in the form of the double sideband suppressed carrier signal as hereinbefore described with reference to FIG. 2. This brightness information component is passed by a low pass filter 36 to a matrix 37 while the colour information component is passed by a band pass filter 38 to two demodulator devices 39, 40. The demodulated output signals from these devices 39, 40 are fed to the matrix 37 which produces from these signals and the brightness information component, red, green and blue colour signals on lines 41, 42, 43 respectively for application to the respective control electrodes of a colour television picture tube 44.

To effect demodulation of the colour information signal in the demodulator devices 39, 40 it is necessary to apply to these devices a continuous electric wave having a frequency corresponding to that of the suppressed carrier. This continuous electric wave is derived from the carrier wave, of the brightness information component, which is selected by the band pass filter 35. The filter is adjustable in that it can be set, according to the setting of the programme selection switch 32, to accept a signal having a frequency of either 4.43 mc./s. or 8.86 mc./s. For the setting of the programme selection switch appropriate for receiving the transmission available across the input terminals 30, the filter 35 will select the signal of 4.43 mc./s. and this is used to provide a corresponding signal for application to the demodulator devices 39, 40 without change of its frequency. However, when the programme selection switch is set to receive the transmission available across the input terminals 31, the filter 35 will select the signal having a frequency of 8.86 mc./s. and in this case this signal must be halved in frequency before it is suitable for obtaining a corresponding signal for application to the demodulator devices 39 and 40. For this purpose the signal selected by the filter 35 is passed to a frequency divider 45 the operation of which is arranged under the control of the switch 32 so that when the latter is set to receive the transmission available between the terminals 31 this frequency divider 45 operates to produce on an output line 46 thereof a corresponding signal having a frequency of 4.43 mc./s. For the other position of the switch 32 the frequency divider 45 is rendered inoperative as in this case the signal selected by the filter 35 has the appropriate frequency for application to the demodulators 39, 40. The filter 35 may be adjusted either by variation of the values of some or all of its components or alternatively by switching in a separate filter network in respect of each frequency.

The signal available on the line 46 is therefore arranged always to have a frequency of 4.43 mc./s. and this signal is applied to a limiter device 47 to obtain a corresponding signal of constant amplitude for application to a phase-shift network 48. This phase-shift network is required because the independent sidebands of the colour information component are in phase quadrature and the phase of the 4.43 mc./s. re-insertion carrier must have the same phase relationship to each pair of sidebands in order to achieve demodulation. Thus the phase-shift network 48 provides one signal path between the limiter device 47 and the demodulator device 39 and another signal path between the limiter device 47 and the demodulator device 40, one of these paths being arranged to advance the phase of the 4.43 mc./s. signal by 45° and the other to retard the phase of this signal by 45° so that the signals emerging from the two paths are in phase quadrature.

It is usual practice in wired television systems to transmit the sound accompaniment of the picture as audio frequency signals over a conductive path of the network, that is to say without the use of a carrier wave, and it is deemed unnecessary to present details of this known technique in this specification. Likewise it is deemed unnecessary in this specification to refer specifically to the synchronising signals which form a part of standard television transmissions.

What I claim is:

1. A wired broadcasting system pertaining to colour television, which comprises a conductive network providing at least one signal path between a transmitting apparatus and at least one receiving apparatus, said transmitting apparatus including means for applying to said conductive path a modulated carrier wave brightness information component and a suppressed carrier wave colour information component, said transmitting apparatus also including means which determine that the frequency of one of said carrier waves is a whole multiple of the frequency of the other to reduce the visible effect of beating between said carrier waves and their harmonics in a picture produced with the aid of said components.

2. A wired broadcasting system as claimed in claim 1 having a plurality of signal paths and a separate transmitting apparatus serving to energise each such path.

3. A colour television transmitting apparatus, for energising a signal path of a conductive network of a wired broadcasting system, comprising a source of brightness information signals and a source of colour information signals in respect of a colour television transmission, means for obtaining two carrier waves the frequency of one of which is a whole multiple of the frequency of the other, means utilising said brightness information signals and one of said carrier waves to produce a modulated carrier wave brightness information component, means utilising said colour information signals and the other carrier wave to produce a suppressed carrier wave colour information component, and means for applying both of said components to said signal path of the conductive network, the said frequency relationship of said carriers ensuring that the picture produced with the aid of said components is not unduly if at all affected by the beating of these carrier waves or their harmonics.

4. A colour television transmitting apparatus as claimed in claim 3, which includes means which make available in respect of a colour television transmission a frequency information signal which is indicative of the frequency of the said suppressed carrier wave, and means utilizing said frequency information signal to provide said two carrier waves the frequency of one of which is a whole multiple of the frequency of the other.

5. A colour television transmitting apparatus as claimed in claim 4, wherein the said means which utilizes the frequency information signal includes means utilizing said frequency information signal to provide a continuous electric wave having the same frequency, and a modulator means utilizing said continuous electric wave together with said brightness information signals and said suppressed carrier wave colour information signals to provide a modulated carrier wave brightness information component, the frequency of the carrier wave of which corresponds to that of the frequency information signal, and a suppressed carrier wave colour information component, the frequency of the suppressed carrier of which is twice that of the carrier wave of said brightness information component.

6. A colour television transmitting apparatus as claimed in claim 4, wherein the said means which utilizes the frequency information signal includes means utilizing said frequency information signal to provide a continuous electric wave having a frequency which is a multiple of that of said frequency information signal, and a modulator means utilizing said continuous electric wave together with said brightness information signals and said suppressed carrier wave colour information signals to provide a modulated carrier wave brightness information component, the frequency of the carrier wave of which corresponds to said multiple of said frequency information signal, and a suppressed carrier wave colour information component, the frequency of the suppressed carrier of which is a different multiple of the frequency of the said frequency information signal.

7. A colour television transmitting apparatus as claimed in claim 5 wherein the means utilising the frequency information signal to provide a continuous electric wave comprises a frequency and phase controlled oscillator device arranged to provide oscillations having the same frequency and phase as said frequency information signal.

8. A colour television receiving apparatus, for use in a wired broadcasting system having a signal path which is energised by colour television signals, comprising means supplying a modulated carrier wave brightness information component and a suppressed carrier wave colour information component, the frequency of one of said carrier waves being a whole multiple of the frequency of the other, wherein means are provided responsive to said first mentioned means for obtaining a continuous electric wave which has a frequency corresponding to that of the carrier pertaining to said brightness information component, and means utilising this continuous electric wave to demodulate the said colour information component.

9. A colour television receiving apparatus as claimed in claim 8 wherein the means provided for obtaining a continuous electric wave having a frequency corresponding to that of the carrier pertaining to said brightness information component includes a band pass filter device arranged to pass a narrow band of frequencies which includes said carrier frequency.

10. A colour television receiving apparatus as claimed in claim 9 wherein said means also includes an amplitude limiting device thereby to impart to said continuous electric wave a substantially constant amplitude.

11. A colour television receiving apparatus as claimed in claim 10 wherein said means further includes a frequency dividing device which, when the frequency of the continuous electric wave is a multiple of that required to demodulate said colour information component, may be arranged to provide an electric wave having the frequency required to demodulate the colour information component.

12. A colour television receiving apparatus as claimed in claim 11 wherein said apparatus is provided with switch means whereby it is enabled to derive colour television signals from any one of a plurality of signal paths in the wired broadcasting system.

13. A colour television receiving apparatus as claimed in claim 12 wherein the frequency of the carrier pertaining to the brightness information component of the colour television signals differs from one path to another of the wired broadcasting system and the switch means are arranged to modify the operation of the band pass filter device and render operative or inoperative as required the frequency dividing device.

14. A colour television receiving apparatus as claimed in claim 11 wherein for the purpose of demodulating the colour information component there is provided two demodulator devices each arranged to receive as one input signal said colour information component and as another input signal the continuous electric wave, one of the input signals being applied to each demodulator device in the same phase and the other of the input signals being applied to one of the demodulator devices in a phase differing by approximately 90° from that in which it is applied to the other demodulator device.

References Cited by the Examiner

Fink, Television Engineering Handbook, McGraw-Hill, N.Y., 1957.

DAVID G. REDINBAUGH, *Primary Examiner.*

J. A. O'BRIEN, *Assistant Examiner.*